United States Patent [19]

Harfst

[11] 4,202,070

[45] May 13, 1980

[54] VACUUM APPARATUS WITH CONCRETE HOUSING, AND METHOD OF CONSTRUCTING SAME

[76] Inventor: Robert G. Harfst, 3751 NE. 192nd, Seattle, Wash. 98158

[21] Appl. No.: 955,131

[22] Filed: Oct. 26, 1978

[51] Int. Cl.$^2$ .............................................. A47L 5/38
[52] U.S. Cl. ................... 15/300 A; 15/314; 15/327 D; 15/339; 15/352; 29/460
[58] Field of Search ................. 15/327 R, 327 D, 314, 15/352, 326, 300 A, 339; 29/460; 264/259, 267, 262, 277, 299, 333

[56] References Cited

U.S. PATENT DOCUMENTS

| | | | |
|---|---|---|---|
| 1,765,784 | 1/1930 | Aldinger | 15/326 |
| 3,308,608 | 3/1967 | Brimberg | 15/327 C X |
| 3,535,730 | 10/1970 | McClure | 15/314 |
| 3,568,239 | 3/1971 | Hamrick | 15/314 |
| 3,618,297 | 11/1971 | Hamrick | 15/314 X |

Primary Examiner—Christopher K. Moore
Attorney, Agent, or Firm—Graybeal & Uhlir

[57] ABSTRACT

A car wash vacuum cleaner and the method of making same is disclosed. The car wash vacuum cleaner comprises an inner shell means. A plurality of vacuum motors are secured within the inner shell means and adapted to provide a suction means therein. A monolithic concrete outer housing surrounds the inner shell means and encloses the top and bottom thereon. A plurality of door means disposed on the concrete housing provides an opening within the housing and inner shell means to both provide a vent means for the vacuum motor and a means for removing dirt particles or the like from within the inner shell. A suction tube fitting extends through the concrete housing and inner shell and is adapted to attach to a suction tube. Dirt particles or the like are drawn through the tube and tube opening into the inner shell when the motors are energized.

38 Claims, 14 Drawing Figures

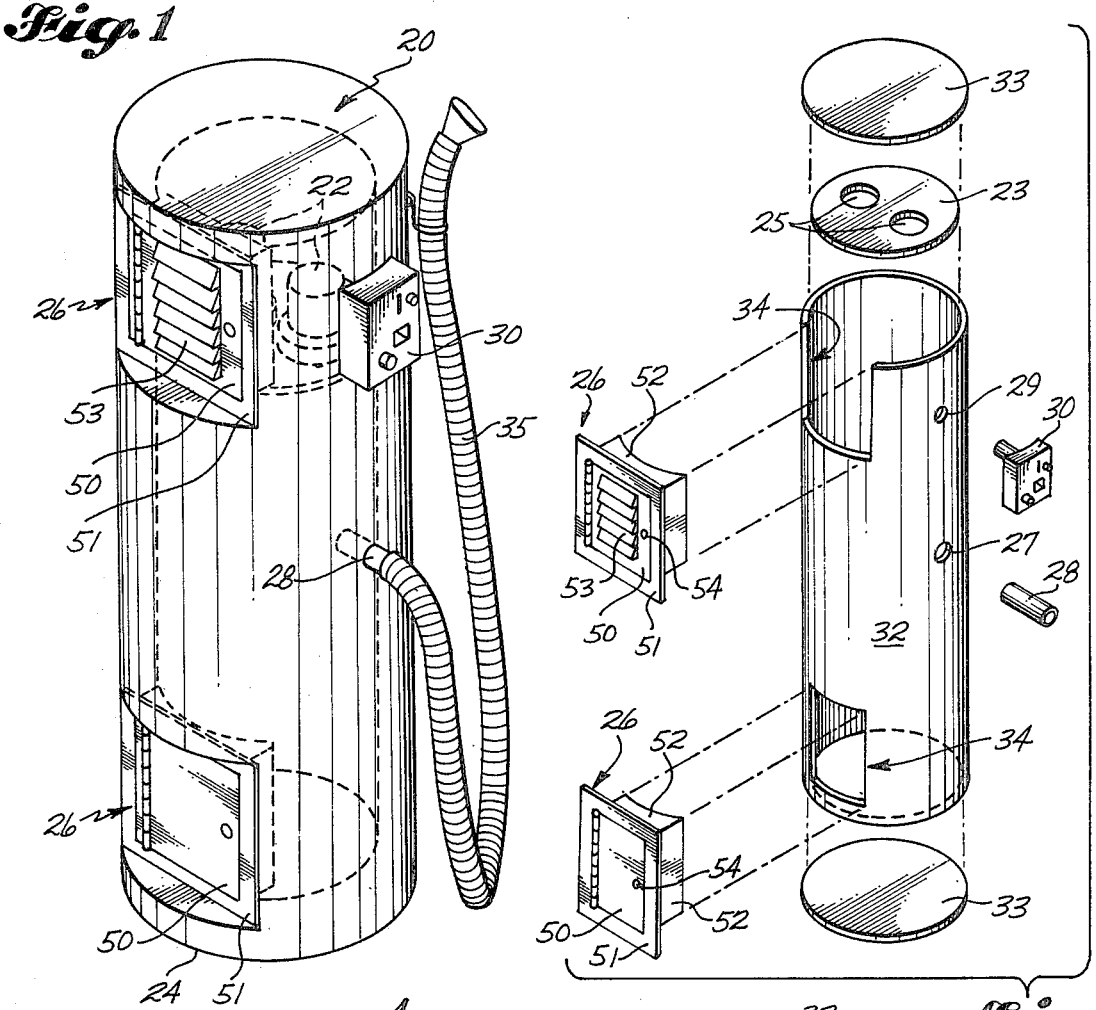
Fig.1
Fig.2
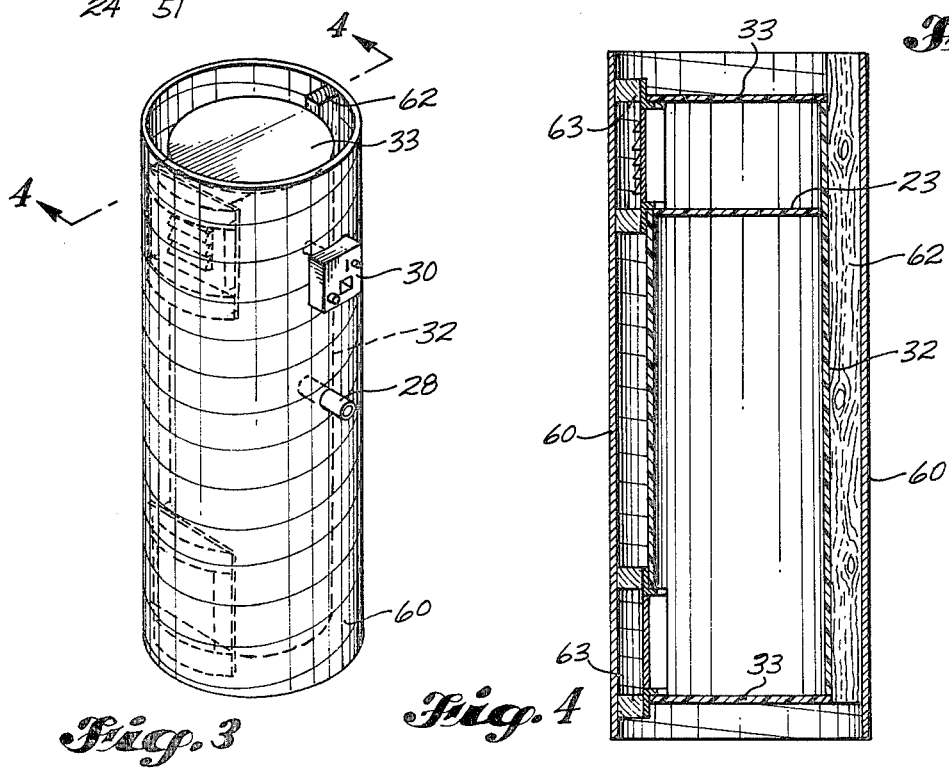
Fig.3
Fig.4

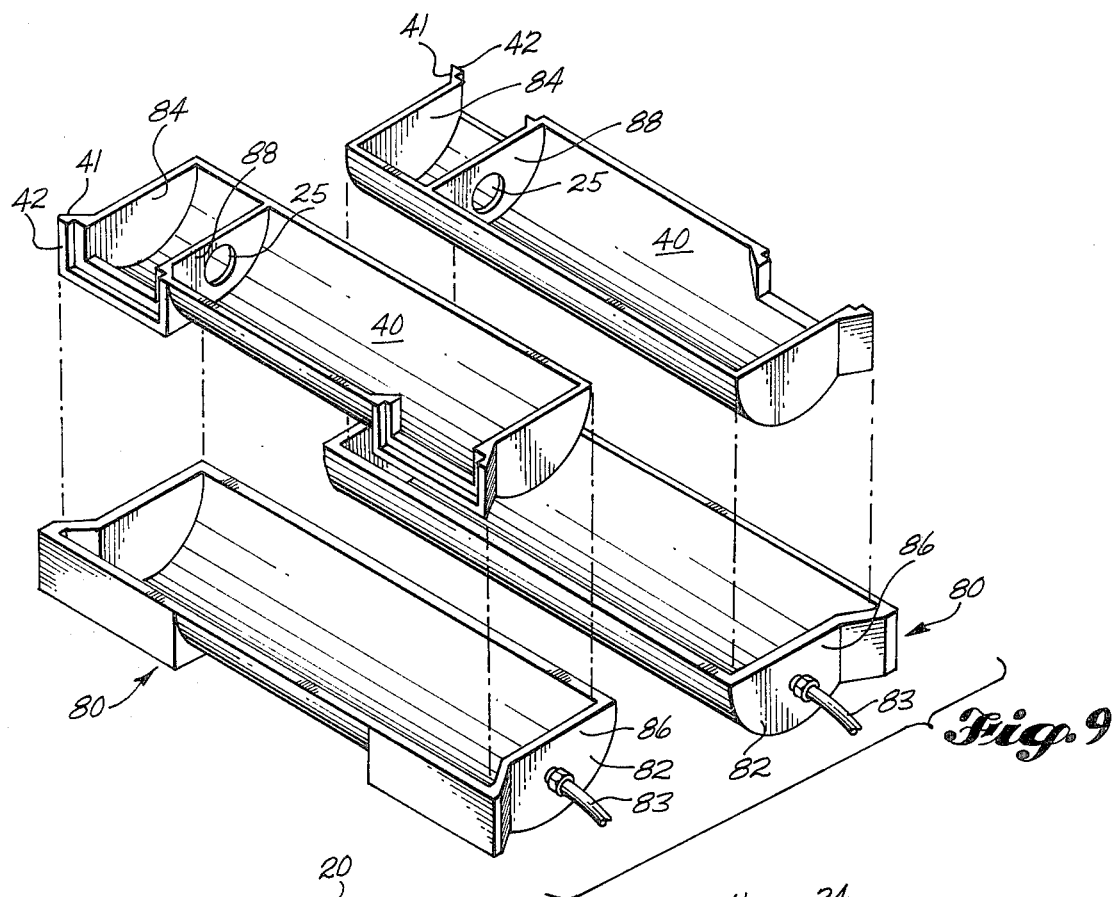
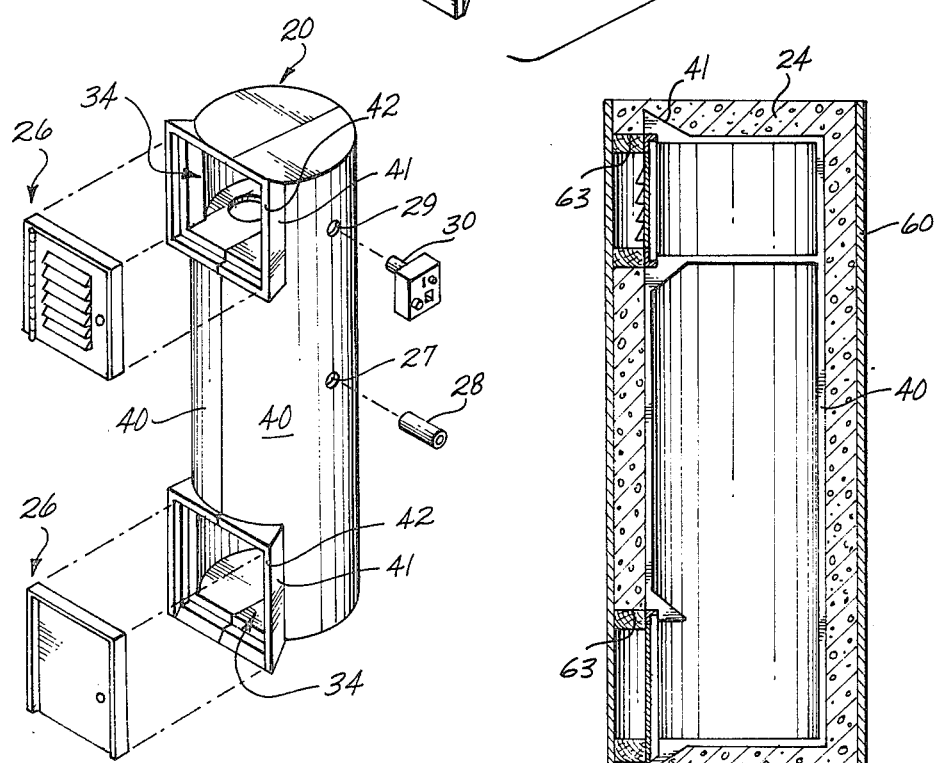

VACUUM APPARATUS WITH CONCRETE HOUSING, AND METHOD OF CONSTRUCTING SAME

DESCRIPTION

Technical Field

This invention relates to a vacuum apparatus and more particularly to a vacuum apparatus adapted for use in self-service type car washes or the like.

BACKGROUND ART

In the prior art, a vacuum apparatus adapted for use in a commercial environment, such as a self-service type car wash or the like, usually comprises a vacuum motor contained within a housing. The housing is typically constructed from fiberglass, or from sections of sheet metal or the like that are bolted or welded together.

One such vacuum apparatus, shown by Livingston, U.S. Pat. No. 4,036,346, comprises a molded fiberglass housing secured to an L-shaped base member constructed from tubing. This type of vacuum apparatus has several disadvantages. The fiberglass housing is susceptible to cracking and breaking, as when inadvertently struck by a vehicle or the like using the apparatus, thereby resulting in loss of the vacuum force produced within the housing. In addition, repeated exposure to the weather fades or discolors the fiberglass housing thereby requiring periodic maintenance such as painting or the like. Finally, the housing and the associated base member, being relatively light and easily transportable, is therefore susceptible to being stolen.

Another vacuum apparatus, shown by Foster, U.S. Pat. No. 3,320,725, has a housing in the form of a tank having a motor therein with the tank being affixed to a wall. This apparatus has the same disadvantages with respect to damage and the loss of vacuum force as discussed above. In addition the relatively small thickness of the sides of the tank coupled with the close proximity of the vacuum motor to the sides of the tank produce an apparatus which is loud and one not well adapted for use in areas where it is desirous to minimize excessive noise.

The present invention overcomes these problems of the prior art. By providing a fiberglass inner shell enclosed by a monolithic outer housing formed from concrete, an essentially airtight vacuum apparatus is produced requiring little or no exterior maintenance. The outer housing is particularly well adapted to withstand the inadvertent contact from the vehicles using the apparatus without the loss of the vacuum pressure within the inner shell. By disposing a plurality of door means on the housing each adapted to extend through the housing and into the inner shell, the vacuum apparatus of the present invention may be quickly and efficiently cleaned and the vacuum motors easily serviced. In addition, the concrete outer housing efficiently attenuates the noise produced by the vacuum motors thereby producing an apparatus which is relatively quiet during operation. Finally, the concrete housing having a considerable weight and mass produces a vacuum apparatus which is not susceptible to being stolen.

DISCLOSURE OF THE INVENTION

According to one aspect of the present invention, a vacuum apparatus is disclosed comprising an inner shell means. A plurality of vacuum motors are secured within the inner shell means with the vacuum motors being adapted to provide a suction means within the inner shell when energized. A monolithic concrete outer housing is disposed adjacent the inner shell and is adapted to surround the inner shell and enclose the top and bottom. A plurality of door means are disposed on the outer housing and provide an opening within the housing and the inner shell. One of the door means is adapted to allow the removal of particles drawn into the inner shell. Another of the door means is adapted to provide both a vent means for the vacuum motors and to service the motors. A suction tube fitting extends through the concrete outer housing into the inner shell and is disposed below the vacuum motors. The suction tube fitting attaches to a suction tube such that when the vacuum motors are energized, particles or the like are drawn through the suction tube and suction tube openings into the inner shell.

According to another aspect of the present invention, a method of forming a vacuum apparatus is disclosed which comprises the steps of constructing a hollow inner shell means having a closed top and bottom and having a plurality of cutouts disposed thereon. A plurality of door means, a suction tube fitting, and a coin operable means are each disposed within the cutouts such that each of the means extend away from the inner shell. A plurality of vacuum motors are mounted within the inner shell such that a substantially airtight chamber is defined between the bottom of the inner shell and the vacuum motors. An outer housing form is placed around the inner shell such that the outer housing form defines a space around and at each end of the inner shell with the plurality of door means abutting the inside surface of the outer housing form and the suction tube fitting and the coin operable means extending through the outer housing form. Concrete is poured into the space between the inner shell means and the outer housing form. The concrete is cured and the outer housing form is then removed.

It is a significant advantage of the present invention that the monolithic concrete outer housing provides a vacuum apparatus requiring little or no external maintenance.

Another advantage of the present invention is that the concrete outer housing in conjunction with the inner shell means provides a substantially airtight enclosure for the vacuum motors thereby increasing vacuum apparatus efficiency.

A still further advantage of the present invention is that the concrete outer housing provides a means of attenuating the noise produced by the vacuum motors disposed therein thereby producing a vacuum apparatus particularly well adapted for quiet operation.

A still further advantage of the present invention is that the door means provides a means for quickly and efficiently removing particles or the like drawn into the inner shell, as well as a means to service the vacuum motors.

The foregoing, and other objects, features and advantages of the present invention will become more apparent in light of the detailed description of the preferred embodiments thereof set forth hereafter, and illustrated in the accompanying drawings.

BRIEF DESCRIPTION OF THE DRAWINGS

FIG. 1 is a perspective view of one embodiment of a typical car wash vacuum cleaner made according to the present invention.

FIG. 2 is a pictorial representation illustrating the typical initial steps of forming one embodiment of a car wash vacuum cleaner in accordance with the present invention.

FIG. 3 is a pictorial representation showing the step of placing an outer housing form around the inner shell.

FIG. 4 is a sectional view taken along lines 4—4 in FIG. 3.

FIG. 9 is a pictorial representation showing the step of removing the channel sections from the plurality of inner shell molds.

FIG. 10 is a pictorial representation showing the steps of attaching the plurality of door means, suction tube member, and coin operable means to the inner shell.

FIG. 11 is a sectional view of an alternate embodiment of a car wash vacuum cleaner made in accordance with the present invention.

BEST MODE OF CARRYING OUT THE INVENTION

Figure 5:
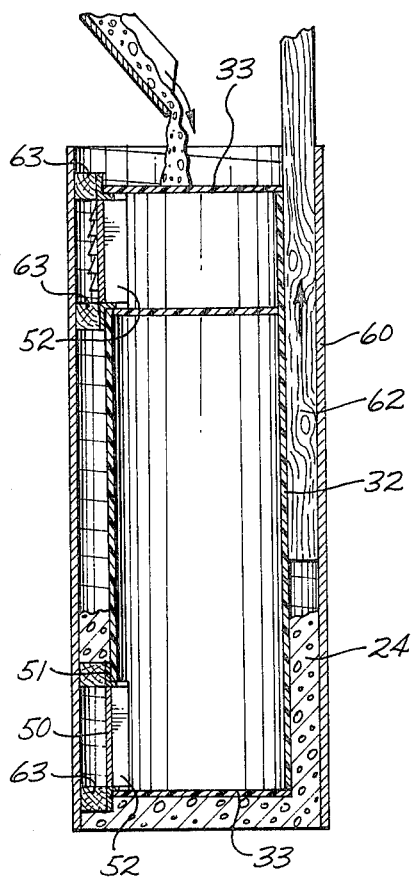
FIG. 5 is a pictorial representation showing the step of pouring concrete in the space defined between the inner shell and the outer housing form.
Figure 6:
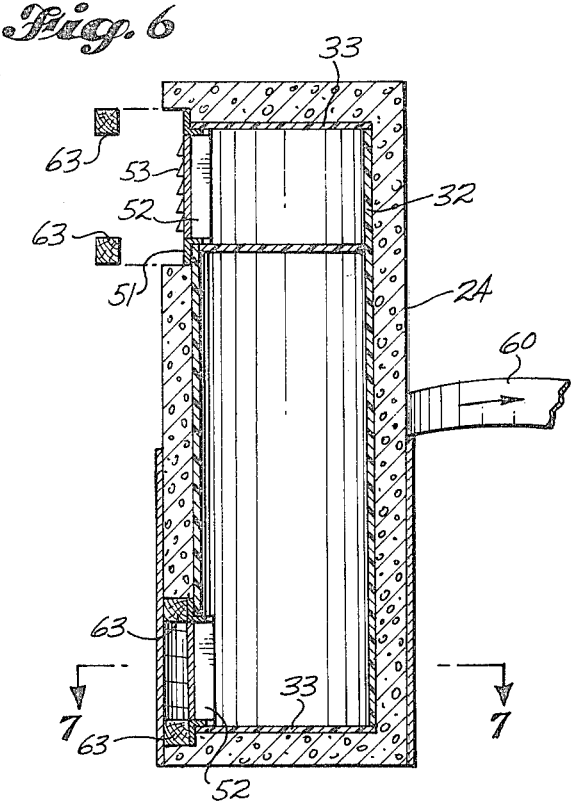
FIG. 6 is a pictorial representation showing the steps of removing the outer housing form and the door brackets.
Figure 7:
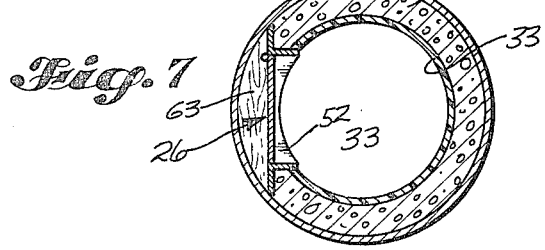
FIG. 7 is a sectional view taken along lines 7—7 in FIG. 6.

In one embodiment of the present invention, as perhaps best shown in FIG. 1, the car wash vacuum cleaner comprises an inner shell means, shown generally at 20, with a plurality of vacuum motors 22 secured therein. A monolithic concrete outer housing 24 surrounds the inner shell and encloses the top and bottom thereon. A plurality of door means, shown generally at 26, are disposed on the concrete housing and provide an opening within the inner shell. A suction tube member 28 extends through the concrete housing and into the inner shell. A coin operable means 30 disposed on the concrete housing has a power extension therein adapted to extend within the inner shell and supply electrical power to the plurality of vacuum motors therein.

One embodiment of inner shell means 20, as best shown in FIG. 2, comprises a hollow fiberglass cylinder 32 having an open top and bottom. The open top and bottom are sealably closed by a plurality of end members 33, such as plywood, sheet metal or the like overlaying the ends of the fiberglass cylinder 32 and bonded thereto by a layer of fiberglass or the like.

The fiberglass cylinder has a plurality of cutouts thereon, shown generally at 34, adapted to provide openings for the plurality of door means 26 as will be described. Cylinder 32 also has a suction tube opening 27 with a suction tube fitting 28 secured therein, and a power opening 29 having the power extension of the coin operable means 30 therein as will be discussed. In this embodiment, fiberglass cylinder 32 typically has a height of sixty-eight inches, a diameter of eighteen inches, and a thickness of substantially one-eighth of one inch. It is a commercially available product such as typically manufactured by the Spunstrand Company of Wallace, Idaho. The suction tube fitting 28 is old per se, and typically is a three inch length of a plastic compound pipe having an inside diameter of two inches.

Figure 12:
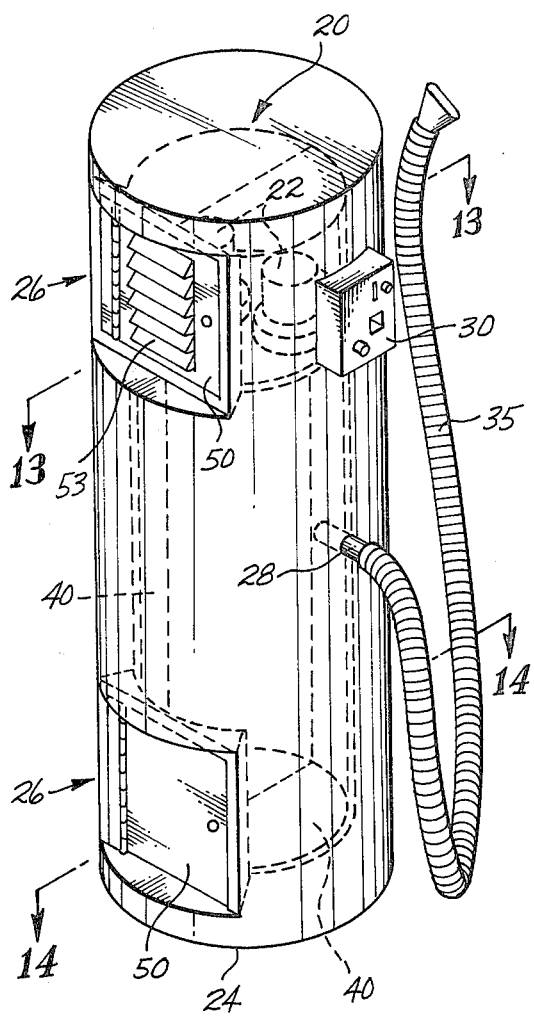
FIG. 12 is a perspective view of an alternate embodiment of a car wash vacuum cleaner made according to the present invention.

In another embodiment, as perhaps best shown in FIGS. 10 and 12, the inner shell means 20 comprises a plurality of channel sections 40 with each section being adapted to attach to the other sections to form the inner shell 20. As shown in FIG. 10, each channel section 40 has an integrally formed portion of the cutouts disposed thereon such that when adjacent channel sections are attached to each other to form the inner shell, the plurality of cutouts 34 is also formed. It is to be understood, however, that although FIG. 10 shows a plurality of channel sections each having a portion of the cutouts thereon, other forms of the channel sections may be utilized to practice the present invention. For example, it has been found that a channel section having the complete integrally formed cutouts 34 disposed thereon adapted to attach to other channel sections without cutouts thereon is a more efficient and economical method of fabricating the inner shell 20. Each cutout has a plurality of members 41 therearound extending somewhat perpendicularly away from the channel section, with each member having a flange 42 thereon adapted to engage and secure said door means 26 thereto.

As can be seen in FIG. 2, one embodiment of the door means 26 comprises a door 50 hingedly mounted to a frame 51. The frame 51 has a plurality of perpendicularly extending members 52 disposed circumferentially around the frame adapted to snugly fit within the plurality of cutouts 34. Door means 26 are secured to the fiberglass cylinder 32 by overlaying a portion of the perpendicularly extending members 52 and a portion of the inside surface of the cylinder 32 with a layer of fiberglass or the like. As shown in FIG. 2, one of the door means, generally disposed at the lower portion of the fiberglass cylinder 32, is adapted to provide an opening within the cylinder to allow removal or dirt particles or the like from within the inner shell. This door means includes a gasket means (not shown) disposed therearound and between the door and frame to allow a substantially airtight closure therebetween. Another door means, generally disposed at the upper portion of the cylinder 32, has a plurality of vent means 53 therein, such as louvers or the like, and provides a means for venting and servicing the vacuum motors 22 as will be described. Doors 50 are hingedly attached to the frame 51 by means which are old per se with the door having a right-handed or left-handed opening as a matter of design choice. The doors are held in the closed position within the frame by a lock means 54 such as a key latch or the like. In this embodiment, the doors and frames are both constructed from stainless steel and are manufactured by Metal Craft Fabricators of Seattle, Washington.

In another embodiment, as shown in FIG. 10, each door means 26 comprises a door 50 hingedly mounted to a frame 51 adapted to engage and be secured to the flange 42 on the inner shell 20. The frame is secured to the flange by the use of a plurality of self-tapping screws or the like. One door means, generally disposed at the lower portion of cylinder section 40 is adapted to allow removal of dirt particles or the like from within the inner shell. This door means also includes a gasket means (not shown) between the door and the frame as has been described. Another door means, generally disposed at the upper portion of the inner shell, has a plurality of vent means 53 therein, such as louvers or the like, and is adapted to provide means for venting and servicing the vacuum motors 22. The doors 50 are held in a closed position within the frame 51 by a lock means 54 such as a key latch or the like. In this embodiment, the doors and frames are also manufactured by Metal Craft Fabricators of Seattle, Washington, and are constructed from stainless steel.

As shown in FIGS. 1 and 12, a plurality of vacuum motors 22 are secured within the inner shell 20 and are adapted to provide a suction means within the inner shell when energized. With reference to FIG. 2, the vacuum motors 22 are secured to a motor mount plate 23 having a plurality of motor openings 25 therein. The motor mount plate is disposed circumferentially around the inside surface of the inner shell 20 such that a substantial airtight space is defined between the bottom of the inner shell and the motor mount plate.

In one embodiment of the present invention, the motor mount plate 23 is constructed from plywood or the like and is bonded to the inside surface of the shell 20 such as by a layer of fiberglass overlaying the plywood. In another embodiment, as perhaps best shown in FIG. 9, the motor mount plate is an integral portion of each cylinder section 40. When the cylinder sections are joined together, the complete motor mount plate is then formed. A plurality of air filter means (not shown) are disposed within the inner shell beneath and abutting the vacuum motors. The air filter means ensure that dirt particles or the like which are drawn into the inner shell 20 will not come in contact with the vacuum motors. The vacuum motors are commercially available motors, typically Model 115757 manufactured by Ametek-Lamb. The plurality of vacuum motors draw approximately two hundred cubic feet of air per minute into the inner shell. It has been found that one such vacuum motor, drawing approximately ninety-six cubic feet of air per minute, was insufficient to efficiently remove dirt particles or the like from a vehicle.

In operation, air and dirt particles are drawn into the inner shell 20 through the suction tube 35 and suction tube opening 27. The air is vented to the outside through the door 50 having the vent means 53 therein. Dirt particles or the like are either trapped by the plurality of air filter means or fall to the bottom of the inner shell 20 where they are subsequently removed through the door means adapted for same.

Figure 13:
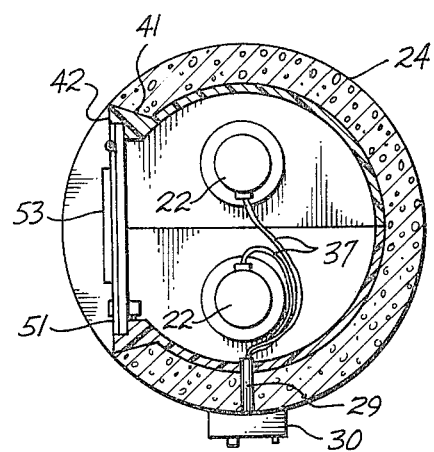
FIG. 13 is a sectional view taken along lines 13—13 of FIG. 12.
Figure 14:
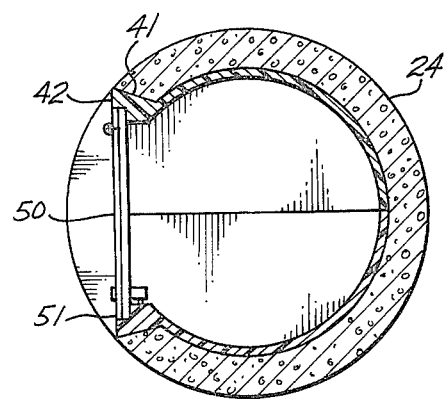
FIG. 14 is a sectional view taken along lines 14—14 in FIG. 12.

A coin operable means 30 is secured to the inner shell 20 such as by screws or the like and is adapted to extend throughout the concrete outer housing 24. The coin operable means is of the type having a timer disposed therein adapted to switch a source of electrical energy to the plurality of vacuum motors for a fixed interval of time. Electrical power is supplied to the motors by a plurality of wires 37 extending through the power opening 29 and the power extension on the coin operable means (see FIG. 13). The timer is old per se and is typically a model TSSB manufactured by Keltner Research Company of Denver, Colorado. The coin operable means is typically a control manufactured by North American Phillips Company of Frederick, Maryland. The coin operable means 30 has a tubular steel outer housing with a stainless steel face plate.

A suction tube opening 27 extending through the monolithic concrete housing 24 and into the inner shell 20 is disposed below the plurality of vacuum motors 22. The opening 27 is adapted to attach to a suction tube fitting 28 and a suction tube 35 such that when the vacuum motors are energized, dirt particles or the like are drawn through the suction tube and the suction tube opening into the inner shell. The suction tube 35 is secured to the concrete outer housing by means which are old per se.

METHOD OF MAKING THE PRESENT INVENTION

One method of making the car wash vacuum cleaner according to the present invention is illustrated in FIGS. 2 through 7. With reference to FIG. 2, the inner shell 20 is constructed using a hollow cylinder 32 of fiberglass or the like having an open top or bottom. The cylinder has a plurality of cutouts 34, a suction tube opening 27, and a power opening 29 thereon. The cutouts 34, and openings 27, 29 are made using a saw, drill or the like.

A motor mount plate 23, constructed from plywood or the like, having a plurality of motor openings 25 therein is placed within the cylinder 32 above the suction tube opening 27 and slightly below the door means 26 having the vent means 53 therein. The motor mount plate is secured within the cylinder such as by overlaying the plate and a portion of the inside surface of the cylinder with a layer of fiberglass or the like.

A plurality of door means 26, suction tube fitting 28, and coin operable means 30 are next secured within their respective openings. The door means 26, with the plurality of perpendicularly extending members 52, is snugly inserted into the plurality of cutouts 34. The door means 26 are attached to the cylinder 32 by a layer of fiberglass or the like extending over a portion of the perpendicularly extending members 52 and over a portion of the inside surface of the cylinder. The coin operable means 30, and the suction tube fitting 28 are inserted into their respective openings and are secured to the cylinder in a similar manner.

The top and bottom of the cylinder 32 are sealed such as by the use of end members 33 formed from plywood or the like secured to the ends of the cylinder such as by overlaying with fiberglass or the like.

With reference to FIGS. 3 through 5, an outer housing form 60 is placed around the inner shell 20 such that the outer housing form defines a space around the inner shell 20 and at the top and bottoms thereon. The form 60 is spaced apart from the inner shell by means of a spacing member 62 and a plurality of door brackets disposed above and below each door means. Spacing member 62 is typically a two inch by three inch wood member of substantially the same height as the outer housing form 60. The spacing member as well as the door brackets are removably secured to the outer housing form such as by the use of screws or the like. The outer housing form 60 is disposed around the inner shell 20 in such a manner that two opposite sides of each frame 51 within each door means 26 abut the interior surface of the outer housing form 60. The outer housing form has a plurality of cutouts therein adapted to allow the suction tube fitting 28 and the coin operable means 30 to extend therethrough. In this embodiment, the outer housing form is a cardboard type construction form known in the art as a Sonotube and is manufactured by Sonoco Products of Bartsville, South Carolina.

The Sonotube typically has a twenty-four inch inside diameter.

Concrete is then poured into the space between the outer housing form 60 and the inner shell 20. It has been found that substantially sixteen bags of a commercially available ready-mix concrete are needed to completely surround the inner shell 20 and enclose the top and bottom thereon. In addition, it has been found that by mixing the first several bags of ready-mix with slightly more water than subsequent bags, a more flowable mix is produced thereby allowing the concrete to easily and quickly flow to the bottom of the form 60 and enclose the bottom of the inner shell 20. With reference to FIG. 5, as subsequent concrete is poured into the space defined between the outer housing form and inner shell, the spacing member 62 is slowly and evenly removed from within that space.

After sufficient concrete has been poured to enclose the top and bottom of the inner shell 20, the concrete is allowed to cure for substantially two days. It is to be understood that this curing time is typical of that used and that other curing times may be used without departing from the spirit and scope of the present invention.

After the concrete has cured, the outer housing form 60 is removed such as by peeling, cutting or the like. The plurality of door brackets 63 are also removed thereby producing the completed car wash vacuum cleaner of the present invention. If needed, additional concrete may be applied around the suction tube fitting 28 and the coin operable means 30 to ensure a substantially airtight closure between these members and the concrete outer housing.

Figure 8:
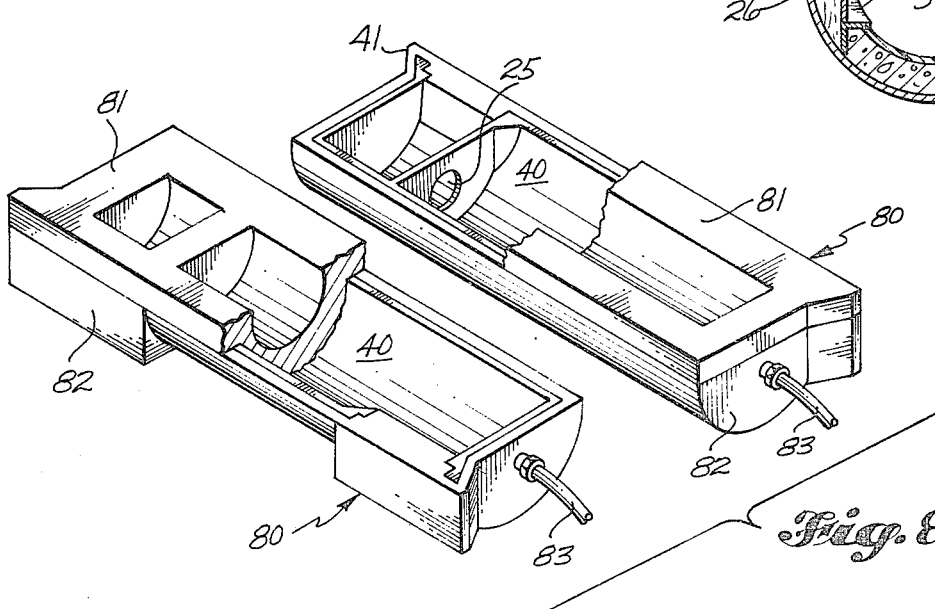
FIG. 8 is a pictorial representation showing the typical initial step of forming an alternate embodiment of a car wash vacuum cleaner in accordance with the present invention.

Another method of making the present invention is illustrated in FIGS. 8 through 14. With reference to FIG. 8, the inner shell is constructed using a plurality of inner shell molds shown generally at 80. The molds 80 comprise a male member 81 in spaced apart relation with female member 82. A coating of a fiberglass bond breaker is applied between the members 81, 82 to facilitate removal therebetween. As shown in FIG. 8, a flowable mix of epoxy resin is pumped by a low pressure means (not shown) between the members 81, 82 through a hose 82. The resin is allowed to cure within the molds for substantially 15 minutes. After the resin has cured, the members 81, 82 are removed producing a plurality of fiberglass channel sections 40.

As shown in FIG. 9, each channel section 40 contains an integrally formed top section 84, bottom section 86, and motor mount plate section 88. In addition, each section contains a section of the plurality of cutouts 34 having a flange 42 circumferentially disposed thereabout. Although FIG. 9 shows a plurality of channel sections each having a section of a cutout thereon, it is to be understood that other channel sections may be used to practice the present invention. For example, it has been found that a more economical and expedient method of forming the plurality of channel sections occurs when one channel section has the entire plurality of complete cutouts thereon. In such a situation, the remaining channel sections have the power opening 29 and suction tube opening 27 disposed thereon.

After the channel sections 40 have been removed from molds 81, 82, they are secured to each other such as by overlaying the joints therebetween including the top 84, bottom 86, and motor mount plate 88 with a layer of fiberglass or the like. The suction tube fitting 28, and coin operable means 30 are secured to the channel sections 40 such as by insertion therein and overlaying therewith with a layer of fiberglass or the like. With reference to FIG. 10, the plurality of door means 26 having frame 61 therein is snugly placed within the plurality of flanges 42 and secured therein by screws or the like.

The remaining steps of making this embodiment of the present invention, such as placing an outer housing form over the inner shell and pouring concrete therebetween, are identical to those described above and are illustrated in FIGS. 11 through 14.

I claim:
1. A vacuum apparatus comprising:
   (a) an inner shell;
   (b) vacuum means secured within said inner shell providing a suction within said inner shell when energized;
   (c) a monolithic concrete outer housing disposed adjacent said inner shell surrounding said inner shell and enclosing the top and bottom thereof;
   (d) a plurality of doors disposed on said housing each providing an opening within said housing and said inner shell and wherein one of said doors allows the removal of particles drawn into said inner shell, and another of said doors provides a vent for said vacuum means; and,
   (e) a suction tube opening extending through said monolithic concrete outer housing and into said inner shell, said opening being disposed below said vacuum means and having a fitting therein attached to a suction tube such that when such vacuum means are energized, particles are drawn through said suction tube and said suction tube opening into said inner shell.

2. The vacuum apparatus of claim 1 further including a coin operable means disposed on said concrete housing having a power extension therein extending within said inner shell and operably connected to said vacuum means, said coin operable means switching a source of electrical energy to said vacuum means for a fixed interval when operated by a coin thereby enabling said vacuum means to become operable during said interval period.

3. The vacuum apparatus of claim 2, wherein said vacuum means are secured to a motor mount plate disposed circumferentially around the inside of said inner shell such that a substantially airtight chamber is defined between the bottom of said inner shell and said motor mount plate.

4. The vacuum apparatus of claim 3, further including a plurality of air filter means disposed within said inner shell beneath and abutting said vacuum means.

5. The vacuum apparatus of claim 4, wherein said inner shell comprises a cylinder having a closed top and bottom and wherein said cylinder has a plurality of cutouts thereon providing openings for said doors.

6. The vacuum apparatus of claim 5, wherein said cylinder is constructed of fiberglass.

7. The vacuum apparatus of claim 5, wherein each door is mounted to a frame having a plurality of perpendicularly extending members therearound fitting within a respective one of said plurality of cutouts in said cylinder such that said door and said frame are attached to said cylinder in spaced apart relation therefrom.

8. The vacuum apparatus of claim 7, wherein said door adapted to allow the removal of particles from within said inner shell includes a gasket disposed between said door and said frame, said gasket allowing a substantially airtight closure therebetween.

9. The vacuum apparatus of claim 7, wherein said plurality of perpendicularly extending members on said frame are attached to said cylinder by a layer of fiberglass overlaying a portion of the inside surface of said cylinder and a portion of each of said perpendicularly extending members.

10. The vacuum apparatus of claim 4, wherein said inner shell comprises a plurality of channel sections wherein each section is attached to the other sections to form said inner shell, and wherein one of said sections has a plurality of cutouts therein having members therearound extending somewhat perpendicularly away from said section with said members having a flange thereon engaging and securing said doors thereto.

11. The vacuum apparatus of claim 10, wherein each door comprises a door hingedly secured to a frame adapted to engage and be secured to said flanges on said perpendicularly extending members.

12. The vacuum apparatus of claim 11, wherein said door adapted to allow the removal of particles from within said inner shell includes a gasket disposed between said door and said frame, said gasket allowing a substantially airtight closure therebetween.

13. The vacuum apparatus of claim 10, wherein said plurality of channel sections are bonded to each other by a layer of fiberglass overlaying a portion of each channel section at the joint between adjacent channel sections.

14. The vacuum apparatus of claim 10, wherein each channel section further includes an integrally formed motor mount section wherein each motor mount section is attached to the motor mount sections integrally formed on said other channel sections to form the completed motor mount.

15. A vacuum apparatus comprising:
  (a) a fiberglass cylinder having a closed top and bottom wherein said cylinder has a plurality of cutouts thereon providing openings within said cylinder;
  (b) a monolithic concrete outer housing disposed adjacent said fiberglass cylinder surrounding said fiberglass cylinder and enclosing the top and bottom thereof;
  (c) a plurality of doors disposed on said concrete outer housing with said doors extending through said housing and within said plurality of cutouts disposed on said fiberglass cylinder, with at least one of said doors allowing the removal of particles drawn into said fiberglass cylinder;
  (d) a plurality of vacuum motors secured within said fiberglass cylinder by a motor mount plate disposed circumferentially around the inside of said cylinder such that a substantially airtight chamber is defined between the bottom of said cylinder and said motor mount plate, said vacuum motors providing a suction within said fiberglass cylinder when energized;
  (e) a suction tube opening extending through said monolithic concrete outer housing into said fiberglass cylinder and disposed below said motor mount means, said opening having a suction tube fitting therein attached to a suction tube such that when said vacuum motors are energized particles are drawn through said suction tube opening into said fiberglass cylinder.

16. The vacuum apparatus of claim 15, further including a coin operable means disposed on said concrete housing extending within said fiberglass cylinder and operably connected to said vacuum motors, said coin operable means switching a source of electrical power to said vacuum motors for a fixed interval when operated by a coin thereby enabling said vacuum motors to become operable during said interval.

17. The vacuum apparatus of claim 15, further including a plurality of air filters disposed within said fiberglass cylinder beneath and abutting said motor mount means.

18. The vacuum apparatus of claim 17, wherein said door allowing the removal of particles from within said fiberglass cylinder includes a gasket disposed between said door and said frame, said gasket providing a substantially airtight closure therebetween.

19. The vacuum apparatus of claim 15, wherein each door is hingedly mounted to a frame having a plurality of perpendicularly extending members therearound adapted to fit within said plurality of cutouts in said fiberglass cylinder such that said door and said frame are attached to said cylinder and in spaced apart relation therefrom.

20. The vacuum apparatus of claim 18, wherein said plurality of perpendicularly extending members are secured to said fiberglass cylinder by a layer of fiberglass overlaying a portion of the inside surface of said cylinder and a portion of each of said perpendicularly extending members.

21. The vacuum apparatus of claim 15, wherein said fiberglass cylinder comprises a plurality of channel sections wherein each section is adapted to attach to the other sections to form said fiberglass cylinder and wherein one of said sections has said plurality of cutouts therein each having fiberglass members therearound extending perpendicularly away from said section with said members having flanges thereon adapted to engage and secure said door means thereto.

22. The vacuum apparatus of claim 21, wherein each door is hingedly secured to a frame adapted to engage and be secured to said flange on said perpendicularly extending members.

23. The vacuum apparatus of claim 22, wherein said door allowing the removal of particles drawn into said fiberglass cylinder includes a gasket disposed between said door and said frame, said gasket providing a substantially airtight closure therebetween.

24. The vacuum apparatus of claim 21, wherein said channel sections are attached to each other by a layer of fiberglass overlaying a portion of each channel section at the joint between adjacent channel sections.

25. The vacuum apparatus of claim 21, wherein each channel section further includes an integrally formed motor mount section wherein each motor mount section is attachable to the other motor mount sections to form the completed motor mount.

26. A method of forming a vacuum apparatus comprising the steps of:
  (a) constructing a hollow inner shell having a closed top and bottom and having a plurality of cutouts disposed thereon;
  (b) attaching a plurality of doors, a suction tube fitting, and a coin operable means within said plurality of cutouts disposed on said inner shell such that said doors, suction tube fitting, and coin operable means fit within said cutouts and extend apart from said inner shell;
  (c) mounting a plurality of vacuum motors within said inner shell such that a substantially airtight chamber is defined between the bottom of said inner shell and said vacuum motors;

(d) placing an outer housing form around said inner shell such that said outer housing form defines a space around said inner shell and at each end thereon, and such that said plurality of doors abut the inside surface of said form and said suction tube fitting and said coin operable means extend through said outer housing form;

(e) pouring concrete into said space defined between said inner shell and said outer housing form; and, (f) during said concrete and removing said form.

27. The method of claim 26, wherein the step of attaching said plurality of doors to said inner shell comprises the step of overlaying a portion of the inside surface of said inner shell and a portion of said doors with a layer of fiberglass.

28. The method of claim 26, wherein the step of mounting said vacuum motors within said inner shell further includes securing a plurality of air filters below said vacuum motors.

29. The method of claim 26, wherein the step of placing said outer housing around said inner shell further includes the step of removably securing said housing to a spacing member disposed along the length of said inner shell and to a plurality of door brackets disposed above and below each door.

30. The method of claim 29, wherein the step of pouring said concrete into said space between said inner shell and said outer housing includes the further step of removing said spacing member from within said space as said concrete is poured into said space.

31. The method of claim 26, wherein the step of attaching a plurality of doors to said inner shell comprises the additional step of placing a gasket within each door to provide a substantially airtight enclosure therein.

32. The method of claim 26, wherein the step of constructing a hollow inner shell comprises:

(a) forming a plurality of inner shell molds of the type having a male member in spaced apart relation to a female member and wherein each of said inner shell molds has a section of an integrally formed top, bottom and motor mount plate therein;

(b) injecting a flowable epoxy resin between said male members and said female members;

(c) curing said epoxy resin within said inner shell molds;

(d) removing said plurality of male members from said plurality of female members to form a plurality of channel sections; and (e) securing each channel section to another channel section to form said hollow inner shell means.

33. The method of claim 32, wherein the step of forming a plurality of inner shell molds comprises the step of forming said plurality such that one of said molds has the plurality of said cutouts thereon.

34. The method of claim 32, wherein the step of securing each channel section to another channel section comprises the step of overlaying the joints between adjacent channel sections with a layer of fiberglass.

35. The method of claim 32 comprising the further step of applying a bond breaker within each of said inner shell molds to facilitate removal of said male members from said female members.

36. The method of claim 32, wherein the step of injecting a flowable epoxy resin within each of said inner shell molds is done at a substantially low pressure.

37. The method of claim 32, wherein the step of curing said epoxy resin within said channel section mold comprises the step of placing said resin in said mold for substantially fifteen minutes.

38. The method of claim 32, wherein the step of attaching a plurality of doors to said inner shell comprises the step of screwably securing said doors to said cutouts disposed within said channel sections.

* * * * *